US 8,977,540 B2

(12) United States Patent
Yasin

(10) Patent No.: US 8,977,540 B2
(45) Date of Patent: Mar. 10, 2015

(54) SELF-LEARNING METHODS FOR AUTOMATICALLY GENERATING A SUMMARY OF A DOCUMENT, KNOWLEDGE EXTRACTION AND CONTEXTUAL MAPPING

(76) Inventor: Syed Yasin, Bangalore (IN)

(*) Notice: Subject to any disclaimer, the term of this patent is extended or adjusted under 35 U.S.C. 154(b) by 158 days.

(21) Appl. No.: 13/575,478

(22) PCT Filed: Jan. 31, 2011

(86) PCT No.: PCT/IB2011/050409
§ 371 (c)(1),
(2), (4) Date: Jul. 26, 2012

(87) PCT Pub. No.: WO2011/095923
PCT Pub. Date: Aug. 11, 2011

(65) Prior Publication Data
US 2012/0303357 A1 Nov. 29, 2012

(30) Foreign Application Priority Data
Feb. 3, 2010 (IN) .............................. 267/CHE/2010

(51) Int. Cl.
G06F 17/27 (2006.01)
G06F 17/20 (2006.01)
G06F 17/30 (2006.01)

(52) U.S. Cl.
CPC ............................. G06F 17/30719 (2013.01)
USPC ..................................... 704/9; 704/1; 704/10

(58) Field of Classification Search
USPC ..................................................... 704/1, 9, 10
See application file for complete search history.

(56) References Cited

U.S. PATENT DOCUMENTS

| 6,038,560 | A | * | 3/2000 | Wical | ................................. | 1/1 |
| 8,306,984 | B2 | * | 11/2012 | Tereposky et al. | ............. | 707/741 |
| 8,533,208 | B2 | * | 9/2013 | Sundaresan et al. | .......... | 707/755 |
| 8,601,023 | B2 | * | 12/2013 | Brave et al. | .................... | 707/776 |
| 2006/0117002 | A1 | * | 6/2006 | Swen | ................................. | 707/4 |
| 2008/0228675 | A1 | * | 9/2008 | Duffy et al. | ..................... | 706/10 |

* cited by examiner

Primary Examiner — Jesse Pullias
(74) Attorney, Agent, or Firm — Oliff PLC

(57) ABSTRACT

Advance Machine Learning or Unsupervized Machine Learning Techniques are provided that relate to Self-learning processes by which a machine generates a sensible automated summary, extracts knowledge, and extracts contextually related Topics along with the justification that explains "why they are related" automatically without any human intervention or guidance (backed ontology's) during the process. Such processes also relate to generating a 360-Degree Contextual Result (360-DCR) using Auto-summary, Knowledge Extraction and Contextual Mapping.

4 Claims, 9 Drawing Sheets

Heart Attack
Definition: A heart attack (myocardial infarction) occurs when an area of heart muscle dies or is permanently damaged because of an inadequate supply of oxygen to that area. Overview, Causes, & Risk ...
http://health.allrefer.com disease : attack : mi

Auto Summary: ...The risk factors for coronary artery disease and heart attack include: Smoking High blood pressure Too much fat in your diet Poor blood cholesterol levels, especially high LDL ("bad") cholesterol and low HDL ("good") cholesterol Diabetes Male gender Age Heredity Many of the risk factors listed are r...........; Definition: A heart attack (myocardial infarction) occurs when an area of heart muscle dies or is permanently damaged because of an inadequate supply of oxygen to that area.........; Overview, Causes, & Risk Factors: Most heart attacks are caused posterior heart arteries
anterior heart arteries
coronary artery disease
heart attack
heart muscle
health disease
middle heart
alzheimer disease
disease condition
health information
health

Heart attack
Definition of Heart attack: A heart attack is when blood flow to a part of the heart is blocked, preventing enough oxygen from getting to the heart. The heart muscle dies or becomes permanently damage...
http://www.umm.edu

Heart attack
Heart attack is when blood vessels that supply blood to the heart are blocked, preventing enough oxygen from getting to the heart. The heart muscle dies or becomes permanently damaged. Your doctor ca...

Figure 6

Knowledge extraction

Overview & Definitions:

Heart attack

A heart attack—also called myocardial infarction or MI—occurs when an area of heart muscle is completely deprived of blood, and the heart muscle cells die.

A heart attack may result when plaque inside the heart arteries breaks open or ruptures, forming a clot that significantly blocks blood flow through the artery.

A plaque is made up of cholesterol, white blood cells, calcium, and other components, and it is surrounded by a fibrous cap. This fibrous cap may tear or rupture if blood suddenly flows faster, or the artery suddenly narrows. A tear or rupture signals the body to repair the injured artery lining, much as it might heal a cut on the skin, by forming a blood clot to seal the area. A blood clot that forms in an artery can completely block blood flow to the heart muscle and cause a heart attack.

The pain of a heart attack often occurs with other symptoms, including:

* Chest discomfort or pain that may be crushing or squeezing or may feel like a heavy weight on the chest. * Chest discomfort or pain that occurs with:
o Sweating. o Shortness of breath. o Nausea or vomiting. o Pain that spreads from the chest to the neck, the jaw, or one or both shoulders or arms. o Dizziness or lightheadedness. o A fast or irregular heartbeat. o Loss of consciousness.

The pain of a heart attack usually will not go away with rest.

It is important to recognize the early stages of a heart attack and to seek emergency care. Medical treatment is needed to prevent death. Sometimes medicines can be given to reduce the damage to the heart muscle caused by a heart attack.

Author: Robin Parks, MS Medical Review: Caroline S. Rhoads, MD - Internal Medicine John A. McPherson, MD, FACC, FSCAI - Cardiology Last Updated: May 6, 2009

Figure 7

»Why or how are these Contextually Related to heart attack?...

- Thrombolytic Therapy:

ing to the American College of Cardiology (ACC), each year 800,000 persons in the United States have acute heart attacks and 213,000 die. Those who die from heart attacks generally die within 1 hour from the initial onset of symptoms and sometimes before they get to the hospital. Many national groups are working together to decrease the time it takes to get people having a heart attack to facilities where tPA can be given. For a person having an acute heart attack, tPA works by dissolving a major clot quickly. The clot is most likely blocking one of the coronary arteries that normally allows blood and oxygen get to the heart muscle. By dissolving the clot, the blood is able to start flowing again to that area of the heart. If the blood flow to the heart is started again rapidly, it may prevent long-term damage to the heart muscle and may even stop an event that could have been fatal. The drug is successful in restoring some blood flow to the heart muscle in approximately 75% of patients, but the resultant blood flow may not be entirely normal. Physicians base their decisions about whether to give tPA for a heart attack on many factors, including a history of chest pain and the results of an ECG test. Other factors used to determine if someone is a good candidate for tPA include age, medical history, gender, history of previous heart attack, history of diabetes, history of low blood pressure, or increased heart rate, and if the person is elderly (older than 70 years) . ...More http://health.allrefer.com y for people suffering from a heart attack or a stroke is recognizing that both conditions are medical emergencies. Please refer to the stroke and heart attack articles for specific symptoms for both conditions. If you suspect you or someone you know is suffering from symptoms of a heart attack or stroke, you should seek help immediately! . ...More http://health.allrefer.com Thrombolytic therapy is the use of drugs to break up or dissolve blood clots, which are the main cause of both heart attacks and stroke. Information: Thrombolytic medications are approved for the immediate

Figure 8

Overview & Definitions:

Heart attack
A heart attack—also called myocardial infarction or MI—occurs when an area of heart muscle is comp ...More»
http://health.msn.com...

Heart Attack
A heart attack is when blood vessels that supply blood to the heart are blocked, preventing enough ...More»
http://health.yahoo.net/channel...

Heart attack
A heart attack usually occurs when a blood clot blocks the flow of blood through a coronary artery ...More»
http://www.mayoclinic.com/health/heart-attack...

How a heart attack happens
If a plaque inside a blood vessel ruptures, the body tries to repair the tear by forming a blood c ...More»
http://health.msn.com...

Heart attack risk
This information was adapted from the National Cholesterol Education Program and National Heart, L ...More»
http://health.msn.com...

Symptoms:

Heart Attack:
Chest pain is a major symptom of heart attack. You may feel the pain inonly one part of your body, ...More»
http://health.yahoo.net/channel...

Heart attack:
Common heart attack symptoms include:
* Pressure, a feeling of fullness or a squeezing pain in ...More»
http://www.mayoclinic.com/health/heart-attack...

Figure 9

SELF-LEARNING METHODS FOR AUTOMATICALLY GENERATING A SUMMARY OF A DOCUMENT, KNOWLEDGE EXTRACTION AND CONTEXTUAL MAPPING

TECHNICAL FIELD

Embodiments of the present disclosure relate to Advance Machine Learning or Unsupervised Machine Learning Techniques. More particularly, embodiments relate to Self-learning process by which a machine generates a sensible automated summary, extracts knowledge, and extracts contextually related Topics along with the justification that explains "why they are related" automatically without any human intervention or guidance (backed ontology's) during the process.

BACKGROUND

No Search engine today brings the justification/description to "Why this relation?", while representing contextual Topics or Search Refinements for the user query during the process of Search. Users wonder, why or how is this Topic Related?, Also, Knowledge representation is the key to the next generation of search as suppose to mere information retrieval basis user queries. This algorithm brings in a 360-degree contextual knowledge representation apart from being capable of answering specific questions.

Currently, most of the search engines are mere keyword based information extraction basis relevance algorithms. There is a huge demand for overall or 360 degree contextual knowledge representation in Search industry, which is the future of search. In a nutshell we have and are in process to build a revelation of $3^{rd}$ & $4^{th}$ generation search engine.

In light of the foregoing discussion, there is a need for a method to solve the above mentioned shortcomings in the search industry.

SUMMARY

The shortcomings of the prior art are overcome and additional advantages are provided through the provision of a method and a system as described in the description.

The present disclosure solves the limitations of existing techniques by providing an Advance Machine Learning or Unsupervised Machine Learning Techniques, which uses a mathematical approach to identify and extract knowledge concepts in a set of given, documents (Unstructured Data). This approach does not necessarily need training data to help make decisions on building the 360-degree contextual map but rather has the ability to statistically learn from the data itself. Given a set of natural documents or web-pages or anything similar, the algorithm is elegant enough to organize the knowledge concepts automatically without any human guidance during the process.

In one embodiment, the technology disclosed in the present disclosure provide an method/process that is elegant enough to sensibly build an Auto-Summary of a given document completely automatically (self-learning) using the important words identified from the document.

In one embodiment, the technology disclosed in the present disclosure is a novel and inventive Text-Analytics framework, which extracts Knowledge completely automatically from Information Indexed or Processed (self-learning). The solution proposed in the present disclosure brings in a 360-degree contextual results; which is highly effective from usability perspective.

In one embodiment, the present technology or process can be used in Search Engines, both Web Search and Enterprise Search. It can also be used in Online Business (AdWords, AdSense). Summarization of Documents, WebPages etc. . . . more importantly LPeSr brings 360-contextual mapping of knowledge and contextual clusters.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The novel features and characteristic of the disclosure are set forth in the appended claims. The embodiments of the disclosure itself, however, as well as a preferred mode of use, further objectives and advantages thereof, will best be understood by reference to the following detailed description of an illustrative embodiment when read in conjunction with the accompanying drawings. One or more embodiments are now described, by way of example only, with reference to the accompanying drawings wherein like reference numerals represent like elements and in which:

FIG. 6 is an exemplary snap shot of the web page highlighting auto summary created by present technology for given documents and/or WebPages.

FIG. 7 is an exemplary snap shot of the web page highlighting Knowledge-Extraction (KE) created by present technology for given documents and/or WebPages.

FIG. 8 is an exemplary snap shot of the web page displaying exploded view of the contextual related topic link that gives information on why and how the topics selected are contextually related.

FIG. 9 is an exemplary snap shot of the web page displaying 360-Degree Contextual Results (360-DCR) for the selected Topic, in accordance with an exemplary embodiment.

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION

The foregoing has broadly outlined the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

Exemplary embodiments of the present disclosure relate to Latent Précis Extraction and Synecdoche Representation (LPeSr) which is a self-learning methodology/process designed to extract important words automatically from a given document or a web page. It then builds an Automated Machine generated summary that is not just mere chopping-off or truncating paragraphs but actually makes it a real sensible summary ensuring that important sentences are very much captured, hence the word "Precis" or "a Summary". Basis the first level of process the method then maps the overall information extracted into "Knowledge Entities" basis a linguistic framework built on Natural Language Processing or NLP. During the final stage the method brings in the description to the contextually related clusters explaining "Why this relation?" . . . . In short a "360-degree contextual representation of Knowledge" or "360-degree contextual map" is achieved as suppose to mere Information retrieval, hence the word "Synecdoche" (Part of something that is used to refer to the whole thing).

Aforesaid features are explained in detail herein below with the help of examples for better understanding. However, these examples should not be construed as the limitation on the scope of the present technology.

Figure 1:
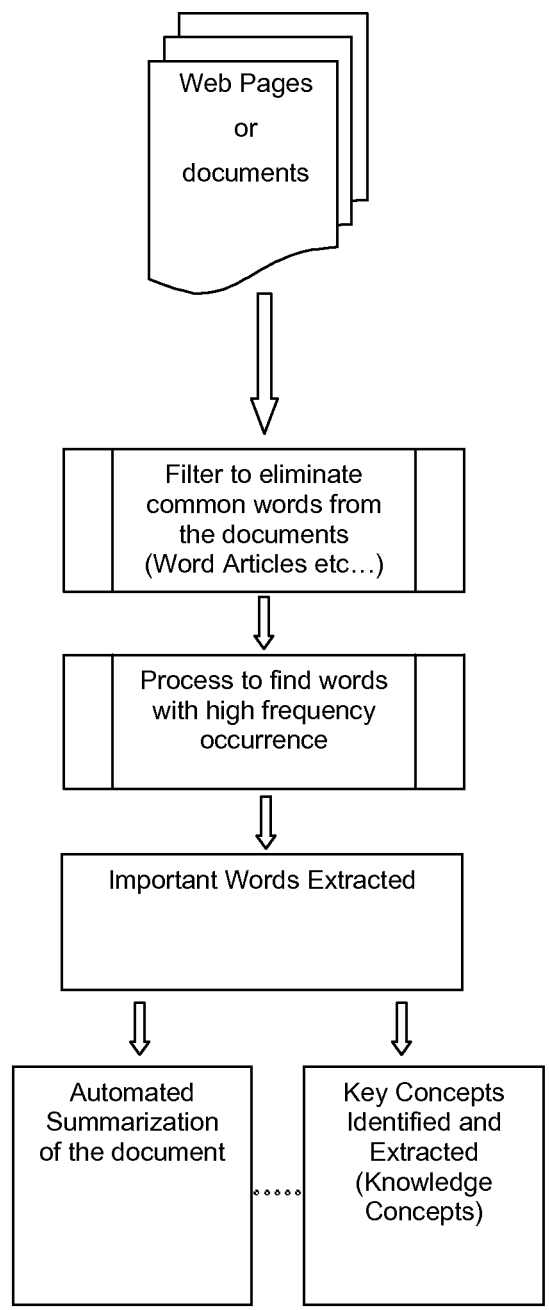
FIG. 1 is a flowchart illustrating a methodology to generate an automated summary of the document and to extract knowledge concepts from the set of given documents, in accordance with an exemplary embodiment.

Referring now to FIG. 1, which illustrates a high-level snap-shot of steps used in generating automated summary of the document and to extract knowledge concepts from the set of given documents. The basic step starts with processing the documents or web-pages using corresponding parsers to extract the textual information. The textual or content within the document is the input to the algorithm. The instant methodology then processes the content of each document to extract important words within it automatically. A standard procedure of finding the frequency of each word in the document can be used to extract the words of high frequency instance after filtering the word articles from the documents. the present technology make use of an elegant technique that is much advanced & efficient from eminence perspective. These words make real sense from practical standpoint to be used in generation of automated summary of the document and to extract knowledge concepts from the set of given documents.

As seen from the FIG. 1 it is obvious that the end result of the instant technology disclosed in the present disclosure is to generate sensible auto-summary of the document and to extract key concepts or knowledge concepts basis the summarization process. Therefore, the instant technology gets into the details of core aspects of the process of auto-summarization and extraction of knowledge concepts.

Let's quickly look into the technique used as a base for extraction of Important-Words (IW) with High-Frequency Occurrence. In one embodiment, identify the words that go together first, example "Saudi Arabia" is a one word although made up of two words. It is termed as "Saudi Arabia"=1(2), this means two words making sense as one word. Therefore in a given document the method finds such words that go together from the incremental order of their occurrences, which means first find the highest order like 1(5), then 1(4), then 1(3) . . . the general way to define this is "m(n)", where "n" is number of words in the group to make one word as a whole. "m" is a constant as it is a representation of the word as a whole.

In one embodiment, the procedure of extracting High-Frequency words of the document, which is applied, would be as follows:

a. m(n), m(n−1), m(n−2), m(n−3) . . . m(n−p)
b. Given the above "n" could be any positive integer; typically/mostly value of "n" is in the range 5 to 4 in practical scenarios. "n−p" is always 2.

For example, if the document content is something like:

"The Kingdom of Saudi Arabia, commonly known as Saudi Arabia is the largest Arab country of the Middle East. It is bordered by Jordan and Iraq on the north and northeast, Kuwait, Qatar and the United Arab Emirates on the east, Oman on the southeast, and Yemen on the south. It is also connected to Bahrain by the King Fahd Causeway . . . . "

To keep it simple for explanation purpose, value of "n" is considered as "2" (value of p=0), therefore the words that go together are identified by the following procedure:

Consider the first two words in the string i.e. "The Kingdom", now since "The" is a word article, this is skipped, the next word "Kingdom of", again "of" is a word article, this combination is skipped too "of Saudi", same case . . . now the next combination "Saudi Arabia" seems to make sense but for a machine does not make sense yet but since there is no word article or punctuation marks this is recorded and assuming this to be a valid word the method processes other words similarly until it finds the same combination again, if it found then "Saudi Arabia" makes it into a valid word of combination 2. Also, it is obvious that the probability of such combination depends upon at least one co-occurrence of such word.

Where ever such combination is found in the contents of the document, the method would extract such a word and record its frequency of occurrence and replace it with a void value or null. Having mentioned this, let's now assume that the initial value of n=4, then first four (4) combinations of the words are considered and proceed to compare with the consecutive combination ex: "The Kingdom of Saudi" & "Kingdom of Saudi Arabia" are compared . . . and so on. Once the document reaches its end, the value of n becomes n−1, which is 3. The process is repeated on the same document now keeping in mind the void or null value too that might have been replaced for any possible valid combination of 4 groups of words. This whole process is repeated until value of p=0.

Now, the only left over words is obviously single words, they are processed to find the highest frequency words. The combination of Group (4), Group (3), Group (2) and (1) words gives a set of valid words that make the document, in other words these words are important to the document.

Therefore, in a practical scenario if a given document has about 1500 to 2000 words and given a very comprehensive list to eliminate "common words" or simply call "Word-Articles" (is, it, the, do, should . . . ) etc. . . . the words in the document get reduced to more than 50%. A huge list of these common words for English and also other languages is freely available (we use one such list and fine tune if there are any missed out words).

In one embodiment, these common words are filtered only during the last stage of the process, i.e. during the process of single-words. Initially for Group (4), Group (3), Group (2), we very much use this common word list to figure out "Word-Groups" (WG) as explained earlier. Once, the method is through the procedure of extracting WG's and Single Words, they typically come down to 15 to 20 words for a document size of about 2000 words. Now, these words are used in a controlled way to develop a sensible automated summary for the given document.

In one embodiment, the following Hypothesis is made basis which the logic for developing an automated summary & knowledge extraction for a given document is judged by the machine/methodology.

1. Every sensible document has a meaning, message that it illustrates to its readers.
2. There are a set of words that are important and around which "common words" or "word-articles" attach to make a sentence that describe these IW. Refer to the paragraph again:

"The Kingdom of Saudi Arabia, commonly known as Saudi Arabia is the largest Arab country of the Middle East. It is bordered by Jordan and Iraq on the north and northeast, Kuwait, Qatar and the United Arab Emirates on the east, Oman on the southeast, and Yemen on the south. It is also connected to Bahrain by the King Fand Causeway . . . . "

The Highlighted bold words are common words. Now, if we analyze the above paragraph point 2 becomes clear.

3. The important words and common words together form sentences . . . typically sentences and paragraphs are the building blocks of a document.
4. Each sentence is separated by a "period" (.) symbol.
5. Therefore, every sentence that contains the IW's becomes important.
6. Also, every other sentence that is close to this particular sentence also can be assumed strongly to be important.
7. Therefore, we just need a technique to elegantly extract these important sentences and join them to make a very sensible summary In one embodiment, the step by step process used in generation of Auto-Summary (Précis) is explained herein in detail. Firstly, the Important Words (IW's) are extracted using the technique explained hereinabove for extracting the IW's to process the next steps to generate an auto-summary. The next step is to list the order of the IW's extracted in the order of highest WG's. The given document is split into sentences, using the period symbol as the mark for the split. All of these sentences are stored in a storage medium in the sequential order. For example storage medium includes but is not limiting to an array, database and any proper media. Let's call this "Array of Sentences" as "AS". For each IW starting in the order of highest WG's, every sentence in AS is analyzed to find if said IW is present. If the IW is found then, that particular sentence is extracted; let's call it "S1". Now this sentence is removed from the list of AS. Therefore, AS becomes (AS−S1). The corresponding IW is also removed from the list of IW's. For example, if there are 10 IW's (IW1, IW2, IW3, . . . IW10), we now would have 9 IW's (IW2, IW3, IW4, . . . IW10). The reason why we might want to remove IW after a match is found is to avoid repetitions or redundancies during final stage of auto-summary creation.

Figure 2:
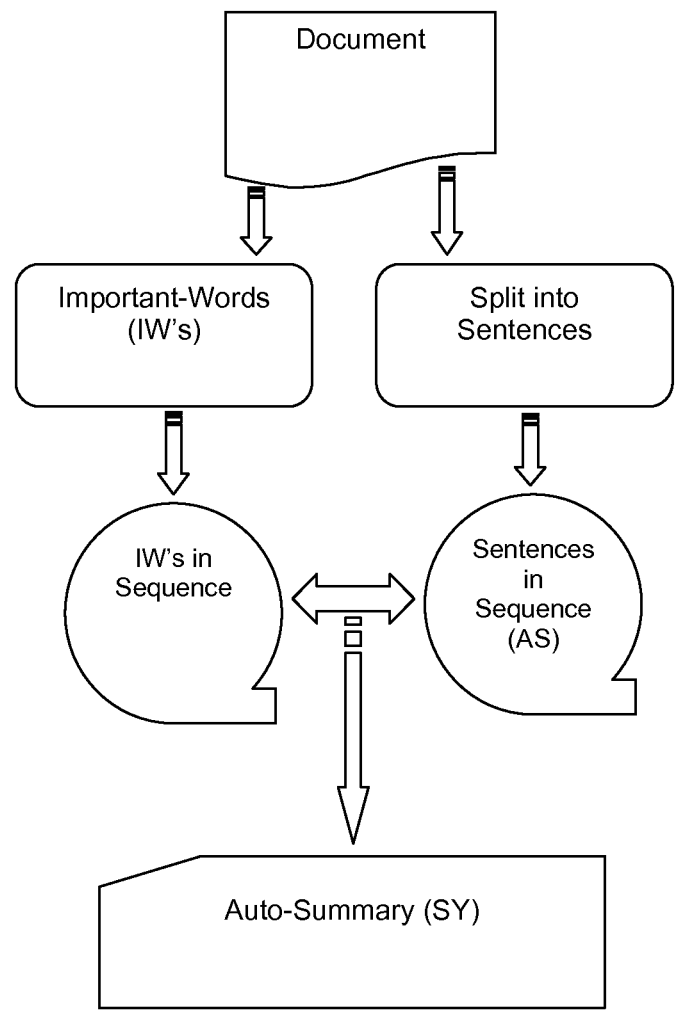
FIG. 2 is a flowchart illustrating a methodology to generate an automated summary of the document, in accordance with an exemplary embodiment.

In one embodiment, above said process is repeated for all other consecutive IW. As a result of which for say about 10 IW's the process would have extracted about 10 sentences that matched (S1, S2, and S3 . . . S10). The combination of these would form a very sensible summary of the given document in the real world, each sentence however is appropriately separated by consecutive periods (about 4 to 5) to give a obvious feeling that these sentences are snippets of the document that are joined. Therefore, resultant auto-summary (SY)→(S1, S2, S3 . . . S10) is a summation of Important-Sentences (IS's)=Auto-Summary of the document as illustrated in FIG. 2. FIG. 6 is an exemplary snap shot of the web page highlighting auto summary created by present technology for given documents and/or WebPages.

In another embodiment, the present disclosure provides details about Knowledge-Extraction (KE) basis Text-Analytics of given sum or set of documents. Basis the hypothesis mentioned earlier, we now look in to the process/methodology used for extracting knowledge from given set of documents.

It is understood that for a given n number of documents, each document would have corresponding IW's and Auto-SummarY (SY) for each document. Firstly, define Topic to each document basis IW's and combination of filename & Title name. This is done by comparing each IW in a document with its filename & Title name, if any of the IW's matches than that is defined as a Topic; else the IW with highest-frequency is defined as the Topic. Sometimes, Topic can be just Title name if it is consistent in the given documents (if we manually analyze and are content with the Title to be Topic, then we simply use Title to be Topic (in most of the cases this is true but involves manual intervention).

Therefore, now we have for each Document (D1), its corresponding Topic (T1), Important-Words (IWs) and its corresponding auto-summary (SY1) and more importantly the Important-Sentences (IS's) (that were extracted to build auto-summary). i.e. D1=T1, IWs, SY1, IS's. Therefore, for given set of n number of documents we would have their corresponding Topic's, Auto-Summaries, Important-Words and Important-Sentences.

Now analyze the data statistically to extract Knowledge-Clusters and corresponding Topic-Clusters that are contextually related. For the given data set of n number of documents, the list of IW's and their corresponding Important-Sentences (IS's) and Topics (T's) are extracted in an order (may be an array, database etc. . . . any proper media). Now, each IW and its corresponding sentence is hashed to generate a hash-code (H), this will be an integer number. Associate hash-code as well with IW's in the list in the same order. In one embodiment, hashing is primarily used to eliminate any redundancies during KE process, as the same hash code is generated for same sentences, duplicates can be removed. I.e. IW+IS=hash code. No two hash codes in the list would be same after filtering duplicates. Where hashing is used to only facilitate removal of redundancies, however any other technique can also be used as an alternative.

Figure 3:
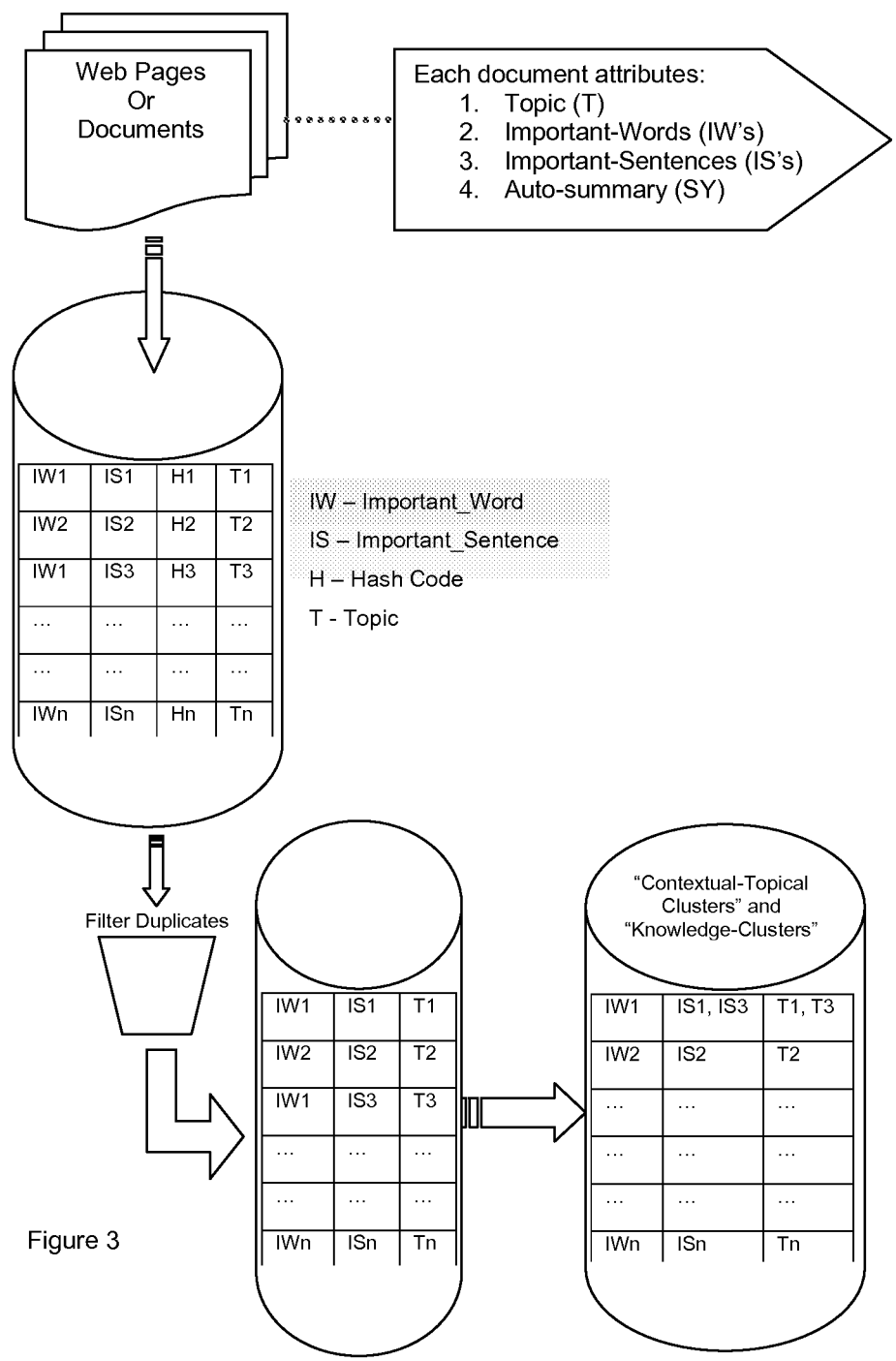
FIG. 3 is a flowchart illustrating a methodology to generate Knowledge-Extraction (KE) basis Text-Analytics of given sum or set of documents, in accordance with an exemplary embodiment.

Once, the duplicates are eliminated, the IS's & Topic's (T's) are Grouped or Clustered in the list based on IW's. Therefore, for each IW, there would be "m" number of Important-Sentences (IS's) & "m" number of Topic's that might have been extracted. The Topic's for each IW cluster can be defined as contextually related. Basis the hypothesis mentioned earlier, if the sentence containing the IW is important then obviously the Topic's of the relative IS's from other documents for the same IW shall be related contextually. Now, we have two clusters for a given IW—"Contextual-Topical Clusters" and "Knowledge-Clusters". Aforesaid process is clearly illustrated in FIG. 3. In another embodiment, it is possible to Group basis Topic instead of grouping basis IW, this depends on the scenario & requirement that one is trying to address. FIG. 7 is an exemplary snap shot of the web page highlighting Knowledge-Extraction (KE) created by present technology for given documents and/or WebPages.

360-Degree Contextual Mapping (Synecdoche)

The basic philosophy of the present disclosure is to bring "Knowledge as suppose to mere Information" during the process of retrieval of results. Although, the process is very laborious and involves huge computation but the end results are simply amazing. The next generation of search is definitely going to be in this direction. Let's understand how this is achieved.

Note that basis the techniques explained earlier we have certain attributes associated with each document after the first two levels of processing, which are Topic (T), Important-Words (IW's), Auto-Summary (SY) and Important-Sentences (IS's). To achieve 360-Degree Contextual-Mapping (360-DCM) the Topics (T's) & the Data or Content (C) of the document itself plays a vital role. There is a certain way in which this is achieved, please refer to the pointers below that explains the same.

For a given set of documents say "n", it has corresponding Topics (Tn) and Content (Cn) associated with that. Index these documents or rather process them in a very specific way. While running an Index on the documents, two separate values or fields are stored in the index which is Topic of the document, and Document Content. During the Indexing process, the Topic that is identified for each document is stored in a storage medium in a predetermined order. For example, storage medium includes but is not limiting to an array, database and any proper media. Let's call this "Topical-List" or "TL". There is a possibility that the TL may contain duplicates, filter these duplicates results in a list with non-redundant Topics. For each Topic in the TL, search index is hit for one Topic at a time and extracted predefined set of results. The predefined threshold of number of results depends upon the size of the Data or Index size. Typically, the first 50 to 150 results could be extracted. For each of the result, the corresponding Topic and Content is extracted. These are stored in a predetermined order. Let's call this "Result-List" or "RL".

Figure 4:
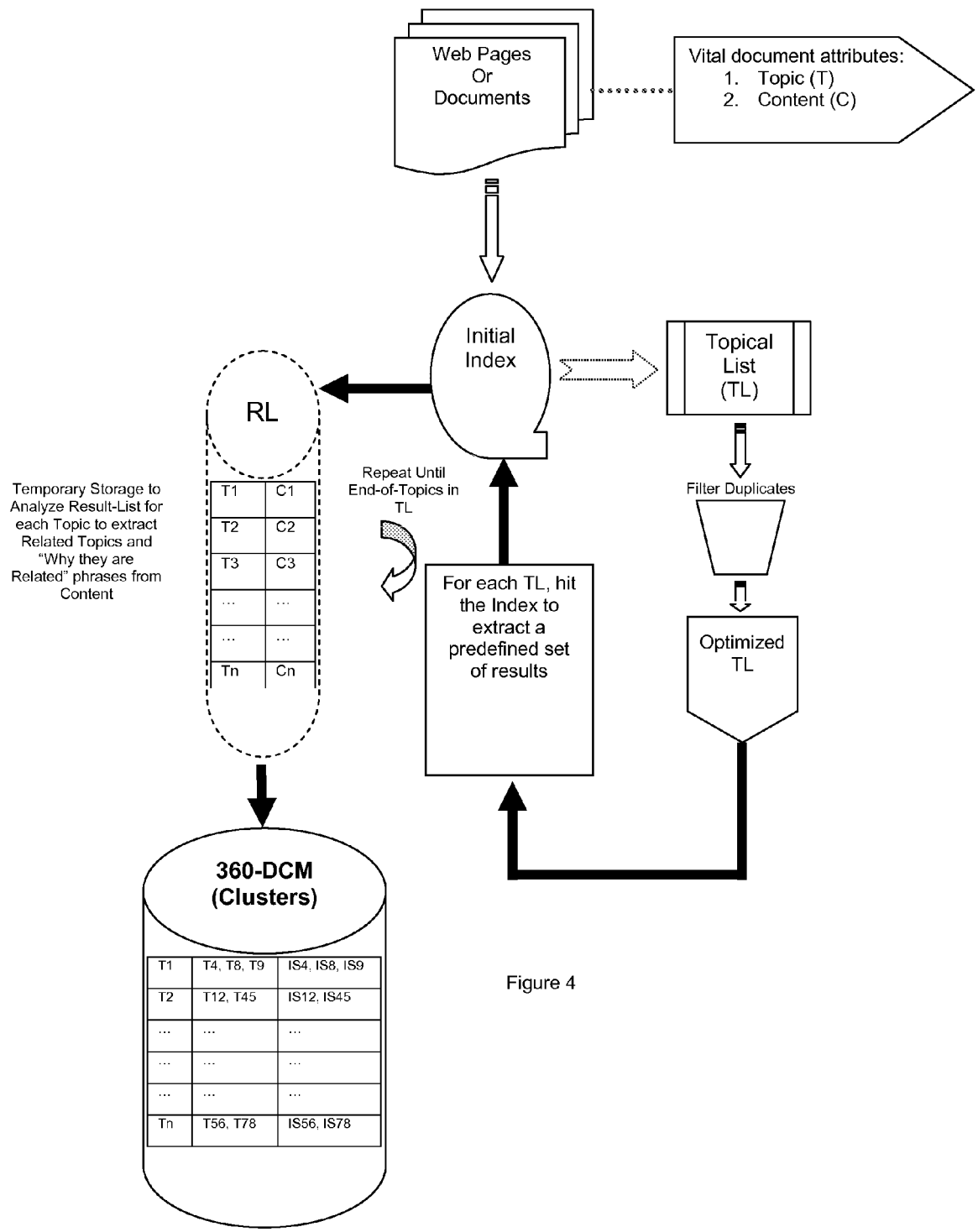
FIG. 4 is a flowchart illustrating a methodology to generate 360-Degree Contextual Mapping (360-DCM) Cluster, in accordance with an exemplary embodiment.

Let's assume that the Topic from TL that hit the Index is "Obama", we get the corresponding RL. Now, there are two things that are analyzed. Firstly, if the RL has Topics that match each other (Example: if they are at least two occurrence of say Topic: "Hillary", then "Hillary", is extracted to be related), they are extracted to be related to the Topic "Obama". Secondly, the corresponding Document Content of the Topics is analyzed to find the sentences that list the word "Obama" (The same technique is used here to split the sentences to find this important word as the method did in the process of auto-summary creation). Refer FIG. 4. Preferably, those sentences that contain both the word "Obama" and the Topic of the document are selected. For example, if the Topic of the document from RL being processed is say "Hillary", then the sentence extracted would be like say "Hillary Diane Rodham Clinton is the 67th United States Secretary of State, serving in the administration of President Barack Obama". This kind of structure would justify "Why this Relationship?" or "How is this Topic Related?" functionality.

In one embodiment, aforesaid process is repeated until all the Topics in the TL are exhausted. The resultant "Related Topics" along with their respective sentences that justify the relationships are stored in a cluster. For example cluster includes but is not limiting to an array, database and any proper media. This is represented as the "360-Degree Contextual-Map" (360-DCM) of a given Topic that describes "Part of something that is used to refer to the whole thing", which is nothing but Synecdoche Representation.

This functionality is extremely helpful during the process of search; the user gets the required information along with contextually related Topics with the explanation of "Why or How are these Related?"; As an example, consider if the user-query is "Heart Attack", then apart from regular results the query hits the 360-DCM and if there is a cluster for the Topic "Heart Attack" then the Related Topics, which it might return may be Thrombolytic Therapy, Coronary artery spasm, Atherosclerosis, Unstable angina. Apart from this if the user clicks on the link "Why or How are these Related?">>, then the following information would be displayed:

Thrombolytic Therapy

Those who die from heart attacks generally die within 1 hour from the initial onset of symptoms and sometimes before they get to the hospital. For a person having an acute heart attack, tPA works by dissolving a major clot quickly. The clot is most likely blocking one of the coronary arteries that normally allows blood and oxygen get to the heart muscle.

health.allrefer.com/health/thrombolytic-therapy . . .

Coronary Artery Spasm

Coronary artery spasm is a temporary, sudden narrowing of one of the coronary arteries (the arteries that supply blood to the heart). In many people, coronary artery spasm may occur without any other heart risk factors (such as smoking, diabetes, high blood pressure, and high cholesterol). If the spasm lasts long enough, it may even cause a heart attack. Treatment: The goal of treatment is to control chest pain and prevent a heart attack.

www.nlm.nih.gov/medlineplus/ency/ . . .

Atherosclerosis

If the coronary arteries become narrow, blood flow to the heart can slow down or stop. This can cause chest pain (stable angina), shortness of breath, heart attack, and other symptoms. This is a common cause of heart attack and stroke. If the clot moves into an artery in the heart, lungs, or brain, it can cause a stroke, heart attack, or pulmonary embolism.

www.nlm.nih.gov/medlineplus/ency/ . . .

Unstable Angina

Unstable angina is a condition in which your heart doesn't get enough blood flow and oxygen. It is a prelude to a heart attack. This causes arteries to become less flexible and narrow, which interrupts blood flow to the heart, causing chest pain. The chest pain: Occurs without cause (for example, it wakes you up from sleep) Lasts longer than 15-20 minutes Responds poorly to a medicine called nitroglycerin May occur along with a drop in blood pressure or significant shortness of breath People with unstable angina are at increased risk of having a heart attack.

nlm.nih.gov/medlineplus/ency/ . . .

An exemplary snap shot of the web page displaying exploded view of the contextual related topic link that gives information on why and how the topics selected are contextually related is illustrated in FIG. 8.

Summing-Up All the Features to Display 360-Degree Contextual Results

Generations of Auto-Summary (Précis), Text-Analytics, Knowledge Extraction and 360-Degree Contextual Mapping (Synecdoche) techniques are explained in detail above. Using all the above steps, the process analyze and index the data in such a way that it will facilitate the retrieval of search results that will portray "360-Degree Contextual Results" of the search query as illustrated in FIG. 5.

Figure 5:
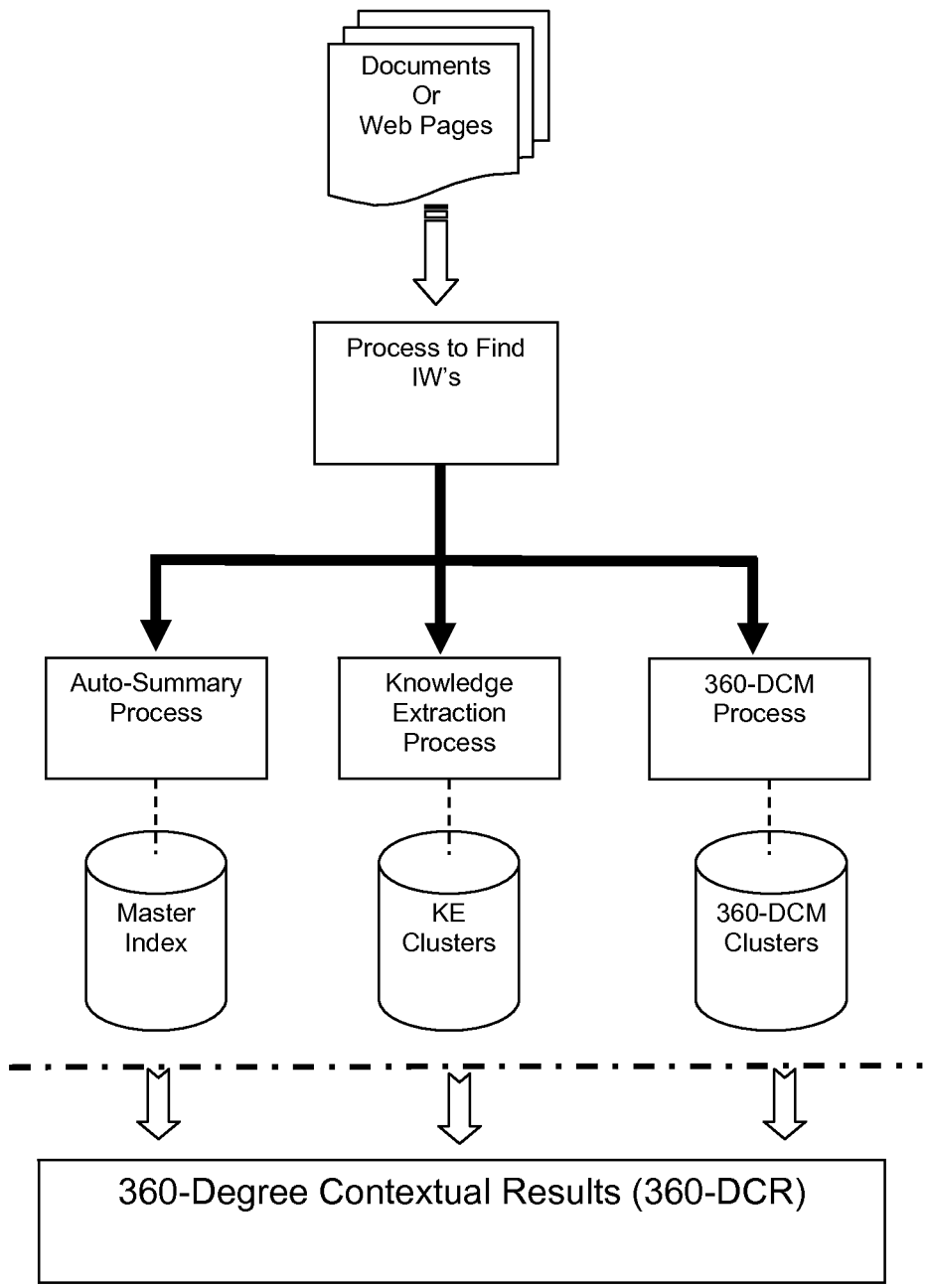
FIG. 5 is a flowchart illustrating a methodology to generate 360-Degree Contextual Results (360-DCR), in accordance with an exemplary embodiment.

As seen from FIG. 5, all the processes are collated together to bring in the 360-DCR, the following is the way in which it is achieved:

For the given data, for each document corresponding Topic (T), Important-Words (IW's), Important-Sentences (IS's), and Auto-summary (SY) is generated as explained earlier. Auto-Summary is stored as a field value during indexing along with corresponding Topic and Content of the document, this we call it the Master-Index, this Index is used for displaying search results. Since, auto-summary is a field value; every result will have a summary of the entire document, which will help the user to have a quick overview of each result without actually having the user to visit the content page. While processing Master-Index the Topical-List is extracted. TL later hits the Master-Index to extract 360-DCM clusters as explained earlier. Knowledge is extracted into KE clusters as explained earlier.

For a given user query the process analyzes it to see if such a Topic exists in the TL, if so the corresponding cluster from the 360-DCM cluster returns related Topics along with the relationship map. The Master-Index returns search results along with auto-summary for each result. The KE cluster is analyzed to see if such an Important-Word (IW) exits, if so relevant Knowledge that is gathered about such a search-query is highlighted. Therefore, in a nutshell the solution is 3 fold, the end-users get Information along with sensible summary of the document, they get Knowledge pertaining to their query and last but not least they also get contextually related Topics listed with the relationship map, which in-itself is a separate result set that is nothing but an advance level of brining in Query-Expansion based results as a part of contextual results.

Hence, for the given query the system brings in information about it along with relevant Knowledge and Contextually related topics and their relationship map, which gives the user more than just mere results. An exemplary snap shot of the web page displaying 360-Degree Contextual Results (360-DCR) for the selected Topic, in accordance with an exemplary embodiment is illustrated in FIG. 9.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and devices within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In addition, where features or aspects of the disclosure are described in terms of Markush groups, those skilled in the art will recognize that the disclosure is also thereby described in terms of any individual member or subgroup of members of the Markush group.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

I claim:

1. A method for automatically generating Contextual Mapping without human intervention, said method comprising acts of:
using a processor to perform the steps of:
processing and indexing one or more documents to identify topics for each document;
storing the topics identified for each document in a predetermined order as a Topical List (TL) and removing duplicate topics from the TL;
extracting a predefined number of results for each Topic in the TL by searching one Topic at a time in the corresponding index;
extracting a corresponding Topic and Content for each of the retrieved result and storing the extracted Topic and Content in a predetermined order as a Result-List (RL) for analysis;
analyzing the RL for the corresponding topic to extract Related Topics,
analyzing Document Content of the corresponding Related Topic to extract "how they are related" phrases from the content; and
clustering the resultant "Related Topics" along with their respective sentences that describe their contextual relationship with a given Topic in TL to represent Contextual Mapping.

2. The method as claimed in claim 1, wherein the predefined number of results depends upon at least one of size of data and index size.

3. The method as claimed in claim 1, wherein identifying topic for each document comprises comparing each Important Words (IW) in the document with its file name and Title name, if any of the IW's matches than that is defined as a Topic.

4. The method as claimed in claim 3, wherein the IW's with highest frequency occurrences in the document is defined as the topic for the document.

* * * * *